(12) United States Patent
Heemstra

(10) Patent No.: US 9,612,001 B2
(45) Date of Patent: Apr. 4, 2017

(54) LIGHTING ARRANGEMENT WITH IMPROVED ILLUMINATION UNIFORMITY

(71) Applicant: PHILIPS LIGHTING HOLDING B.V., Eindhoven (NL)

(72) Inventor: Tewe Hiepke Heemstra, Veldhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/769,715

(22) PCT Filed: Nov. 13, 2014

(86) PCT No.: PCT/EP2014/074422
§ 371 (c)(1),
(2) Date: Aug. 21, 2015

(87) PCT Pub. No.: WO2015/074934
PCT Pub. Date: May 28, 2015

(65) Prior Publication Data
US 2016/0290572 A1    Oct. 6, 2016

(30) Foreign Application Priority Data

Nov. 25, 2013    (EP) .................................. 13194208

(51) Int. Cl.
*F21V 9/08* (2006.01)
*F21V 9/00* (2015.01)
(Continued)

(52) U.S. Cl.
CPC .............. *F21V 9/08* (2013.01); *F21V 7/0066* (2013.01); *F21V 9/00* (2013.01); *F21V 9/16* (2013.01);
(Continued)

(58) Field of Classification Search
CPC . F21K 9/54; F21K 9/56; F21V 7/0066; F21V 9/08; F21V 9/00; F21V 9/16;
(Continued)

(56) References Cited

U.S. PATENT DOCUMENTS 7,157,839 B2    1/2007 Ouderkirk et al.
7,618,157 B1    11/2009 Galvez et al.
(Continued)

FOREIGN PATENT DOCUMENTS

JP    2002314136 A    10/2002
WO    2013041979 A1    3/2013
(Continued)

OTHER PUBLICATIONS

A. Thelen, "Design of Optical Interference Coatings", McGraw-Hill, 1989, pp. 180-195.
(Continued)

*Primary Examiner* — Stephen F Husar

(57) ABSTRACT

A lighting arrangement (1) is disclosed. The lighting arrangement (1) comprises at least two light sources (2) which are arranged in a pattern along a longitudinal axis (L) and adapted to emit light in a first wavelength range. The lighting arrangement (1) also comprises a wavelength converting layer (5) arranged at a distance from the at least two light sources (2). The wavelength converting layer (5) is arranged to receive light emitted from the at least two light sources (2) and adapted to convert light in the first wavelength range to light in a second wavelength range. A spectrally selective layer (6) is arranged between the at least two light sources (2) and the wavelength converting layer (5). The spectrally selective layer (6) is adapted to reflect light in the first wavelength range having an angle of incidence smaller than a predefined angle and to transmit
(Continued)

light in the first wavelength range having an angle of incidence larger than a predefined angle.

12 Claims, 2 Drawing Sheets

(51) Int. Cl.
    *F21V 9/16*     (2006.01)
    *G02B 5/28*     (2006.01)
    *F21V 7/00*     (2006.01)
    F21Y 101/00     (2016.01)
    F21Y 103/10     (2016.01)
    F21Y 115/10     (2016.01)

(52) U.S. Cl.
    CPC ............ *G02B 5/28* (2013.01); *F21Y 2101/00* (2013.01); *F21Y 2103/10* (2016.08); *F21Y 2115/10* (2016.08)

(58) Field of Classification Search
    CPC ........... F21Y 2101/02; F21Y 2103/003; F21Y 2101/00; F21Y 2103/10; F21Y 2115/10; G02B 5/28
    See application file for complete search history.

(56) References Cited

U.S. PATENT DOCUMENTS 8,169,135 B2 *   5/2012   Zhai ......................... F21K 9/56
                                                                                                                                             257/678
8,205,998 B2     6/2012   Ramer et al.
2006/0291238 A1   12/2006   Epstein et al.
2012/0132944 A1    5/2012   Hsieh et al.

FOREIGN PATENT DOCUMENTS

WO        2013054226 A1     4/2013
WO        2013081351 A1     6/2013

OTHER PUBLICATIONS

H.A. MacLeod, "Thin-Film Optical Filters", Taylor & Francis, 2001, pp. 368-377.

* cited by examiner

LIGHTING ARRANGEMENT WITH IMPROVED ILLUMINATION UNIFORMITY

CROSS-REFERENCE TO PRIOR APPLICATIONS

This application is the U.S. National Phase application under 35 U.S.C. §371 of International Application No. PCT/EP2014/074422, filed on Nov. 13, 2014, which claims the benefit of European Patent Application No. 13194208.8, filed on Nov. 25, 2013. These applications are hereby incorporated by reference herein.

FIELD OF THE INVENTION

The present disclosure relates to a lighting arrangement having a wavelength converting layer, such as a remote phosphor layer.

BACKGROUND OF THE INVENTION

In some lighting arrangements, wavelength converting materials are used together with narrow-bandwidth light sources for producing light of a particular color, typically white light. The basic principle of one such technique is to use the light sources to photoexcite the wavelength converting material which then emits light in a wavelength range such that the combination of that light and light from the light sources that has not been converted appears white.

A common example of lighting arrangements based on this technique are so-called remote phosphor systems in which the wavelength converting material is a phosphor arranged at a distance from the light sources, usually light-emitting diodes (LEDs). It is common to provide such lighting arrangements with blue LEDs and to have the light of the LEDs mix with a predominantly yellow light emitted by the phosphor so that white light is formed.

An example of a remote phosphor system is the tubular blue LED lamp with remote phosphor disclosed in U.S. Pat. No. 7,618,157 B1. This lamp has LEDs arranged on a linearly extending heat sink and enclosed by a plastic cover with phosphor.

In many domestic, commercial, industrial and other applications, it is desirable that the lighting arrangement deliver a uniform illumination. There is a need to improve existing lighting arrangements in this respect.

SUMMARY OF THE INVENTION

A general objective is to provide an improved or alternative lighting arrangement having a wavelength converting material. An aspect of particular interest is the degree of uniformity of the illumination from the lighting arrangement.

The invention is defined by the independent claim. Embodiments are set forth in the dependent claims, the description and the drawings.

According to a first aspect, there is provided a lighting arrangement with at least two light sources which are arranged in a pattern along a longitudinal axis and adapted to emit light in a first wavelength range. The lighting arrangement comprises a wavelength converting layer arranged at a distance from the at least two light sources. The wavelength converting layer is arranged to receive light emitted from the at least two light sources and adapted to convert light in the first wavelength range to light in a second wavelength range. A spectrally selective layer is arranged between the at least two light sources and the wavelength converting layer. The spectrally selective layer is adapted to reflect light in the first wavelength range having an angle of incidence smaller than a predefined angle and to transmit light in the first wavelength range having an angle of incidence larger than the predefined angle.

By "a spectrally selective layer" is meant a layer that is substantially transparent to some wavelengths, but not to other wavelengths. The spectrally selective layer can help create a light mixing chamber, inside the lighting arrangement, from which a particular type of light has a low probability of escaping. By "angle of incidence" is meant the angle formed by a light ray incident on a surface and a direction perpendicular to the surface at the point of incidence.

The spectrally selective layer can help diffuse the light from the light sources so that the illumination from the lighting arrangement becomes more uniform. The fact that perpendicularly incident light in the first wavelength range is reflected by the spectrally selective layer can reduce the intensity of the light from a particular light source that strikes the wavelength converting layer near that light source. The individual light sources may therefore appear more diffuse and less like point sources to an observer. This may improve the uniformity of the illumination from the lighting arrangement.

Moreover, since the spectrally selective layer is adapted to influence light in the first wavelength range, i.e. the light from the light sources, the result can be that the light having the highest intensity is the light that is diffused the most. This can be a particularly efficient way to increase the uniformity, both in terms of intensity and color, of the illumination from the lighting arrangement. There may be less optical losses in a lighting arrangement with a spectrally selective layer of this type than in a lighting arrangement with a diffuser that diffuses light of all wavelengths roughly equally.

The first wavelength range can include all or some of the wavelengths of blue light. The second wavelength range can include all or some of the wavelengths of green light, yellow light and/or red light. The highest intensity of the light in the second wavelength range can be in the wavelength range of yellow light.

The predefined angle can depend on a distance between two light sources and a distance between a light source and the spectrally selective layer. For example, a lighting arrangement with longitudinally equidistant light sources can have a spectrally selective layer adapted to reflect light whose point of incidence, in the longitudinal direction, is less than about half the longitudinal distance between two light sources away from the emitting light source. The effect of this is that light from one source is not emitted immediately "above" that source. If an even greater spread is desired, the required distance from the emitting light source is two, three or even four times the distance between light sources.

The spectrally selective layer can be arranged in contact with the wavelength converting layer. For example, the spectrally selective layer can be provided on the side of the wavelength converting layer that is directed towards the light sources. The spectrally selective layer can cover the wavelength converting layer completely or partially. Integrating the spectrally selective layer and the wavelength converting layer, so that there is only one boundary between the two layers, can reduce undesired Fresnel reflections and improve the focus of the illumination produced by the lighting arrangement.

Alternatively, the spectrally selective layer can be arranged at a distance from the wavelength converting layer and the light sources. It may be advantageous from a cost perspective to arrange the wavelength converting layer and the spectrally selective layer at a distance from each other.

The spectrally selective layer can have the shape of a part of a cylinder. A spectrally selective layer having such a shape can be simple to produce and is particularly suitable for the present invention. Note that the base of a cylinder can have any shape. For example, the cylinder can be a substantially circular cylinder or a substantially elliptic cylinder. By "substantially circular cylinder" is meant that the sizes of any deviations from the shape of a perfect circular cylinder are small relative to the radius and the length of the cylinder. The meaning of "substantially elliptic cylinder" is analogously defined. The cylinder can be substantially centered on the longitudinal axis. By "substantially centered" is meant that any distance between a center axis of the cylinder and the longitudinal axis is small relative to the length of the cylinder and the largest width of the base of the cylinder.

The spectrally selective layer can be adapted to diffuse incident light in a direction perpendicular to the longitudinal axis. By "diffusing incident light in the longitudinal direction" is meant that the longitudinal directional component of light that strikes the spectrally selective layer changes upon reflection. For example, light which has no directional component in the longitudinal direction before reflection can have such a directional component after reflection. This construction serves to increase the diffusion of the light emitted by the light sources and may render the illumination from the lighting arrangement more uniform. In order to diffuse light, the spectrally selective layer can have a shape adapted to spread out and/or randomize the directions of light that is reflected or transmitted by the spectrally selective layer. For example, the spectrally selective layer can have protrusions and/or indentations in a regular or irregular pattern. The spectrally selective layer can have a slightly wavy shape, a slightly curved shape, a slightly warped shape and/or a slightly pointed shape in the longitudinal direction. The surface of the spectrally selective layer that faces the light sources can have a regular or irregular three-dimensional structure adapted to diffuse light.

For example, in the case of a circular cylindrical shape, the cross section of the spectrally selective layer in a plane perpendicular to the longitudinal axis will have substantially the shape of an arc of a circle. By having "substantially the shape of an arc of a circle" is meant that the sizes of any deviations from the shape of an arc of a perfect circle are small relative to the radius of the circle. A spectrally selective layer with such a cross section can be simple to produce and is particularly suitable for the present invention. The circle can be substantially centered on the longitudinal axis. By a circle being "substantially centered on the longitudinal axis" is meant that any distance between the center of the circle and the longitudinal axis is small relative to the radius of the circle. The radii can vary along the longitudinal axis, so as to provide a "wavy" layer. The degree of variation is preferably between one and three.

The lighting arrangement can have at least one reflector for reflecting light towards the wavelength converting layer and/or the spectrally selective layer. The provision of at least one such reflector can result in a reduction of optical losses and in enhanced efficiency of the lighting arrangement. For example, light which is reflected by the spectrally selective layer can reflect off the reflector and strike the spectrally selective layer again, possibly at an angle of incidence allowing transmission. Moreover, light emitted by the wavelength converting layer towards the inside of the lighting arrangement can be redirected towards the outside of the lighting arrangement by the reflector.

The at least one reflector can be a diffuse reflector. The provision of a diffuse reflector may result in light reflecting off the reflector being spread out efficiently and, hence, in an increased uniformity of the illumination from the lighting arrangement. Alternatively, the reflector can be a specular reflector.

The wavelength converting layer can comprise one or more phosphors. There are many phosphors with different excitation and emission properties commonly available, something which facilitates the provision of lighting arrangements suitable for different types of applications. The light emitted by the one or more phosphors can have a high intensity in the yellow spectrum.

The light sources can be solid state lighting (SSL) devices. SSL devices have a long life time and are energy efficient. Moreover, they do not contain mercury, and their robustness and small size make them versatile and suitable for many applications. The light sources can be of the same type or of different types. The light sources can be adapted to emit blue light. The light sources can for example be blue LEDs. It is possible to form wavelength converting layers whose excitation and emission properties make them particularly suitable for use in combination with light sources that emit blue light, and blue LEDs of high quality are commercially available at a low cost.

The lighting arrangement can comprise a support structure and a tubular cover arranged along the support structure, wherein the at least two light sources are arranged on the support structure and the tubular cover is provided with the wavelength converting layer. The wavelength converting layer can for example be applied on the tubular cover, for example in the form of a coating, or dispersed in the tubular cover. A tube lighting device formed in this way can have many domestic, commercial and industrial uses.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
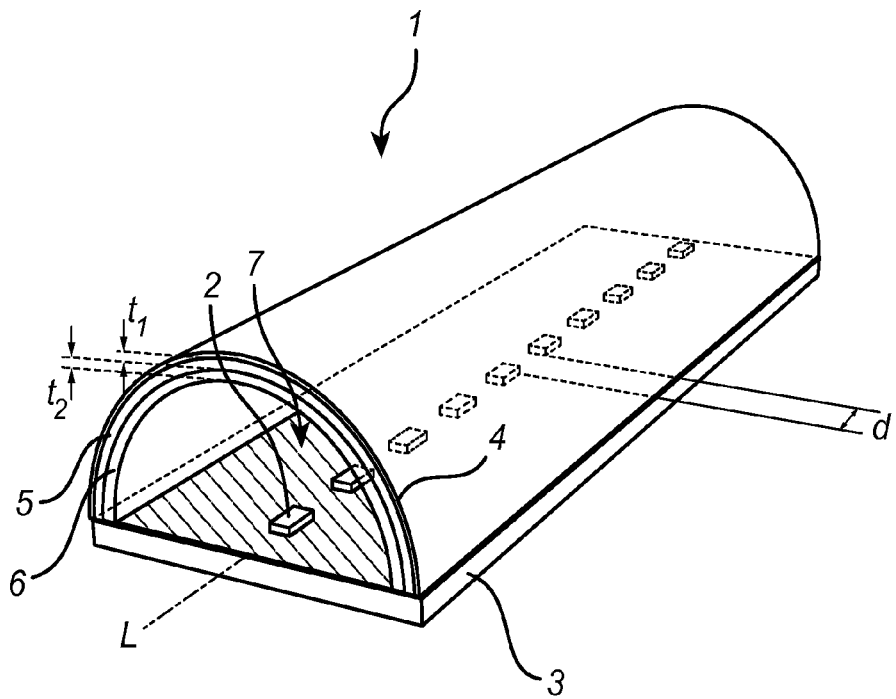
FIG. 1 illustrates schematically a perspective view of a tube lighting device with a spectrally selective layer arranged on a remote phosphor layer.

FIG. 1 illustrates schematically a lighting arrangement 1 in the form of a tube lighting device. Note that the tube lighting device 1 does not have to be straight, as in FIG. 1, but can be curved. The tube lighting device 1 can have the shape of a torus or a sphere. It can be rectangular.

The tube lighting device 1 has light sources 2 in the form of LEDs which can be chosen from the group consisting of semiconductor LEDs, organic LEDs and polymer LEDs. Other types of light sources 2 are conceivable, for example laser diodes. The LEDs 2 are arranged on a support structure 3 which can include electrical circuitry. For example, the support structure 3 can have integrated electrical contacts and an integrated printed circuit board, for example a metal core printed circuit board. The LEDs 2 are arranged on the support structure 3 along a longitudinal axis L. In FIG. 1, the LEDs 2 are arranged along a straight line which substantially coincides with the longitudinal axis L, but they can be arranged in any pattern, for example a zigzag pattern. The longitudinal distance d between the LEDs 2 is usually less than about 10 cm. The appropriate number of LEDs 2 per unit area depends on factors such as the power of each LED 2 and the efficiency of the cooling of the lighting arrangement 1. High-power LEDs 2 are typically positioned farther apart than low-power LEDs 2. The support structure 3 can function as a heat sink for cooling the LEDs 2 as well as other components of the tube lighting device 1. The support structure 3 can comprise a material that spreads heat, for example a metal. The metal can be aluminum.

A light-transmissive cover 4 is arranged along the support structure 3. The cover 4 can be formed by plastics or glass. The cover 4 can be formed by polycarbonate. The shape of the cover 4 can, for example, be that of a part of a substantially circular cylinder the center axis of which substantially coincides with the longitudinal axis L so that the center axis of the cylinder coincides with the straight line along which the LEDs 2 are positioned. In FIG. 1, the cover 4 has the shape of half a circular cylinder.

The tube lighting device 1 includes a wavelength converting layer 5 arranged at a distance from the LEDs 2. The wavelength converting layer 5 can comprise at least one phosphor and is hereinafter referred to as a remote phosphor layer. The at least one phosphor can be chosen from the group consisting of yttrium aluminum garnet (YAG), lutetium aluminum garnet (LuAG) and ECAS. The remote phosphor layer 5 can be arranged on the inner side of the cover 4, as in FIG. 1. The remote phosphor layer 5 can cover the entire inner side of the cover 4, or a part thereof. The thickness $t_1$ of the remote phosphor layer 5 can be from the size of a few phosphor particles to several millimeters.

The remote phosphor layer 5 can have a shape and/or composition adapted to enhance the diffusion of light. For example, the remote phosphor layer can have a microstructure that helps diffuse light. Materials that enhance diffusion may form part of the remote phosphor layer 5. An example of such a material is titanium dioxide.

The remote phosphor layer 5 can be provided in the form of a carrier with phosphor. The carrier typically has a high durability against exposure to light in the first wavelength range. The carrier can be formed by glass or plastics, such as polycarbonate. The carrier can be a foil. The remote phosphor layer 5 can be provided in the form of phosphor dispersed in a layer of a transparent material, for example silicone. The phosphor can be dispersed in the cover 4, whereby the cover 4 acts as a carrier.

In FIG. 1, a spectrally selective layer 6 is arranged on the remote phosphor layer 5 so that the spectrally selective layer 6 is arranged between the remote phosphor layer 5 and the LEDs 2. The spectrally selective layer 6 can cover all of, or part of, the remote phosphor layer 5. The thickness $t_2$ of the spectrally selective layer 6 is typically between a quarter of a wavelength and a few wavelengths of the light emitted by the LEDs 2. The spectrally selective layer 6 can be adapted to diffuse incident light in the longitudinal direction L. For example, the surface of the spectrally selective layer 6 that faces the LEDs 2 can have a structure especially adapted for this purpose. Such a structure is typically small enough not to be visible from the outside of the cover 4.

The spectrally selective layer 6 can be formed by a carrier provided with a spectrally selective material, for example in the form of a coating, film or similar. The carrier typically has a high durability against exposure to light in the first wavelength range. The carrier can be formed by glass or a plastic, such as polycarbonate. The carrier can be a foil.

The tube lighting device 1 can include a reflector 7 for reflecting light towards the remote phosphor layer 5 and/or the spectrally selective layer 6. The reflector 7 can be arranged on the support structure 3, the inner side of the cover 4, or both. The reflector 7 can be specularly reflective. Alternatively, the reflector can be diffusely reflective. For example, the reflector 7 can be a sheet or layer of micro cell polyethylene terephthalate (MCPET).

Figure 2:
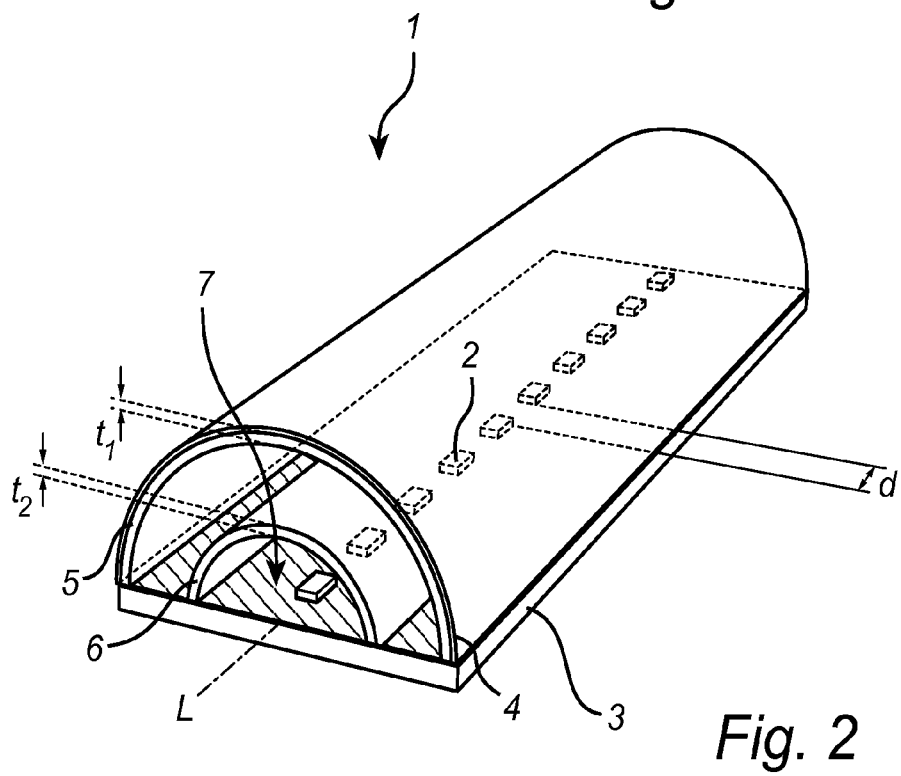
FIG. 2 illustrates schematically a perspective view of a tube lighting device with a spectrally selective layer arranged at a distance from a remote phosphor layer.

FIG. 2 illustrates a tube lighting device 1 which is similar to that illustrated in FIG. 1. However, the tube lighting device 1 in FIG. 2 has a spectrally selective layer 6 arranged at a distance from the remote phosphor layer 5 and from the LEDs 2. The spectrally selective layer 6 can be attached to the support structure 3. The spectrally selective layer 6 can have the shape of a part of a substantially circular cylinder the center axis of which substantially coincides with the longitudinal axis L. In FIG. 2, the spectrally selective layer 6 has the shape of half a circular cylinder. This means that the cross section of the spectrally selective layer 6 perpendicular to the longitudinal axis L has the shape of a semicircle. Note that the center axis of the circular cylinder substantially coincides with the straight line along which the LEDs 2 are positioned.

Figure 3:
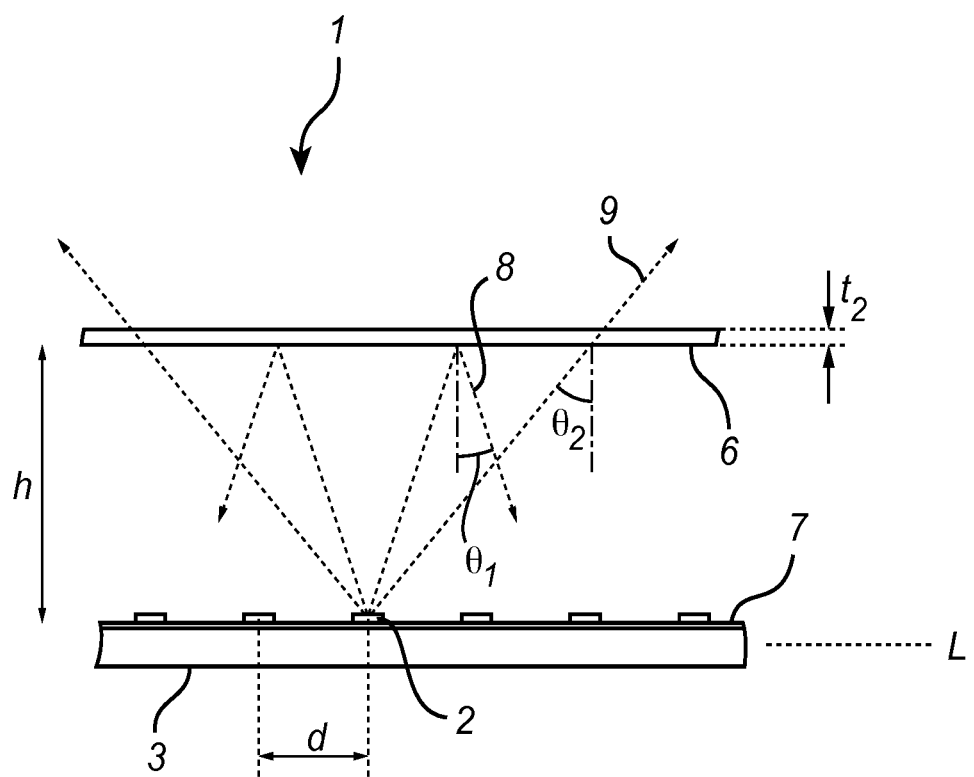
FIG. 3 illustrates schematically a cross sectional view in a longitudinal direction of a tube lighting device.

FIG. 3 illustrates a tube lighting device 1 in cross section along the longitudinal axis L. The LEDs 2 emit light in a first wavelength range which typically includes some or all of the wavelengths of blue light, i.e. from about 450 nm to about 495 nm. However, the first wavelength range can include other wavelength ranges, for example some or all of the wavelengths of red light, i.e. from about 620 nm to about 750 nm, and/or some of or all of the wavelengths of green light, i.e. from about 495 nm to about 570 nm. The light which is emitted by the LEDs 2 and which strikes the spectrally selective layer 6 can be transmitted or reflected. A reflected ray 8 of light in the first wavelength and a transmitted ray 9 of light in the first wavelength range are illustrated in FIG. 3. The reflected ray 8 strikes the spectrally selective layer 6 at an angle $\theta_1$ of incidence smaller than a predefined angle. The transmitted ray 9 strikes the spectrally selective layer 6 at an angle $\theta_2$ of incidence larger than the predefined angle.

How to form a spectrally selective layer having the desired transmission and reflection properties is deemed to be known to the skilled person. For example, a layer which reflects light having an angle of incidence smaller than a predefined angle and transmits light having an angle of incidence larger than the predefined angler can be achieved by an interference filter having alternating layers with different refractive indices. Relevant references include the books "Design of Optical Interference Coatings" by A. Thelen (McGraw-Hill, 1989) and "Thin-Film Optical Filters" by H. A. MacLeod (Taylor & Francis, 2001).

The predefined angle can be chosen depending on a distance d between the light sources 2 as well as on a distance between the light sources and the spectrally selective layer 6. For example, if the spectrally selective layer 6 has the shape of a part of a circular cylinder the center axis of which coincides with the longitudinal direction L, the predefined angle can—but does not have to—be approximately equal to arctan(d/(2h)). Such a spectrally selective layer 6 can reduce transmission of light directly above each LED 2, as viewed in the figures, because light emitted by an individual LED 2 is only transmitted if it strikes the spectrally selective layer 6 sufficiently far away from said individual LED 2. This can result in the intensity of the illumination from the tube lighting device 1 being more uniform. In particular, the intensity of the illumination may vary less according to the positions of the LEDs 2.

Light reflected by the spectrally selective layer 6 may strike the reflector 7 and be redirected towards the spectrally selective layer 6. The reflections may have changed the direction of the light so that it can be transmitted by the spectrally selective layer 6. Light transmitted by the spectrally selective layer 6 can get absorbed by the remote phosphor layer 5. The thickness $t_1$ of the remote phosphor layer 5 is one parameter that can influence how much of the incident light that is absorbed. The absorption of light can result in the remote phosphor layer 5 being photoexcited and light in a second wavelength range being emitted. Typically, the remote phosphor layer 5 is adapted to emit light that, when combined with light emitted by the LEDs 2, forms white light. For example, the light emitted by the LEDs 2 can be blue and the light emitted by the remote phosphor layer 5 can be yellow, or predominately yellow. Light emitted by the remote phosphor layer 5 can be directed towards the inside of the tube lighting device 1. Such light can be redirected toward the outside of the tube lighting device 1 after reflecting off the reflector 7. The light that leaves the tube lighting device 1 forms the illumination produced by the tube lighting device 1.

The person skilled in the art realizes that the present invention by no means is limited to the preferred embodiments described above. On the contrary, many modifications and variations are possible within the scope of the appended claims. For example, the lighting arrangement can form backlights in liquid-crystal displays.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A lighting arrangement, comprising
    at least two light sources arranged in a pattern along a longitudinal axis and adapted to emit light in a first wavelength range and
    a wavelength converting layer arranged at a distance from the at least two light sources,
    the wavelength converting layer being arranged to receive light emitted from the at least two light sources and adapted to convert light in the first wavelength range to light in a second wavelength range,
    characterized by a spectrally selective layer arranged between the at least two light sources and the wavelength converting layer, which spectrally selective layer is adapted to reflect light in the first wavelength range having an angle of incidence smaller than a predefined angle and to transmit light in the first wavelength range having an angle of incidence larger than the predefined angle,
    wherein the cross section of the spectrally selective layer in a plane perpendicular to the longitudinal axis has substantially the shape of an arc of a circle.

2. The lighting arrangement according to claim 1, wherein the predefined angle depends on a distance between two light sources of the at least two light sources and a distance between a light source of the at least two light sources and the spectrally selective layer.

3. The lighting arrangement according to claim 1, wherein the spectrally selective layer is arranged in contact with the wavelength converting layer.

4. The lighting arrangement according to claim 1, wherein the spectrally selective layer is arranged at a distance from the wavelength converting layer and the at least two light sources.

5. The lighting arrangement according to claim 1, wherein the spectrally selective layer has the shape of a part of a cylinder.

6. The lighting arrangement according to claim 1, wherein the spectrally selective layer is adapted to diffuse incident light in a direction perpendicular to the longitudinal axis.

7. The lighting arrangement according to claim 1, wherein the spectrally selective layer is an interference filter.

8. The lighting arrangement according to claim 1, further comprising at least one reflector for reflecting light toward the wavelength converting layer.

9. The lighting arrangement according to claim 8, wherein the at least one reflector is a diffuse reflector.

10. The lighting arrangement according to claim 1, wherein the wavelength converting layer comprises one or more phosphors.

11. The lighting arrangement according to claim 1, wherein the at least two light sources are SSL devices.

12. A lighting arrangement according to claim 1, further comprising
    a support structure and
    a tubular cover arranged along the support structure,
    wherein the at least two light sources are arranged on the support structure and the tubular cover is provided with the wavelength converting layer.

* * * * *